United States Patent [19]

Yonekubo et al.

[11] Patent Number: 4,756,611
[45] Date of Patent: Jul. 12, 1988

[54] MULTIPLE-PURPOSE MICROSCOPE

[75] Inventors: Ken Yonekubo; Yasuo Inoue; Itaru Endo, all of Hachiouji, Japan

[73] Assignee: Olympus Optical Co., Ltd., Tokyo, Japan

[21] Appl. No.: 859,969

[22] Filed: May 5, 1986

Related U.S. Application Data

[63] Continuation-in-part of Ser. No. 646,514, Aug. 31, 1984, abandoned.

[51] Int. Cl.⁴ .................... G02B 21/12; G02B 21/14
[52] U.S. Cl. ............................... 350/509; 350/510; 350/520; 350/521; 350/526; 350/527
[58] Field of Search ............ 350/526, 527, 525, 524, 350/523, 509, 510, 507, 502, 520, 521

[56] References Cited

U.S. PATENT DOCUMENTS 3,503,662 3/1970 Grzelak et al. .................... 350/510
4,407,569 10/1983 Piller et al. ........................ 350/526

OTHER PUBLICATIONS

Fritz Ruch et al., "A Microscope Fluorometer . . .", *Functional Photography*, vol. 16, No. 2, Mar./Apr. 1981, pp. 14–16.
John P. Zeidler, "The Fluorescence Microscope", *Laboratory Equipment Dig.*, vol. 12, No. 7, Jul., 1974, pp. 48–57.

*Primary Examiner*—Jon W. Henry
*Attorney, Agent, or Firm*—Cushman, Darby & Cushman

[57] ABSTRACT

A multiple-purpose microscope comprising: a stage for placing a specimen; a revolver for carrying a plurality of objective lenses; a differential interference unit mounted adjacent to the revolver so as to be moved into and out of a path of light beam; and two dichroic mirror units for reflecting fluorescence mounted so as to be moved into and out of the path of a light beam, whereby enabling its user to perform various different types of microscope examinations by a simplified examination mode changeover operation. The dichroic mirror unit for reflecting fluorescence is comprised of a dichroic mirror, an exciting filter and a barrier filter.

3 Claims, 5 Drawing Sheets

MULTIPLE-PURPOSE MICROSCOPE

CROSS-REFERENCE TO RELATED APPLICATIONS

This application is a continuation-in-part of application Ser. No. 646,514, filed Aug. 31, 1984 now abandoned.

BACKGROUND OF THE INVENTION (a) The present invention relates to a microscope, and more particularly relates to a multiple-purpose microscope which enables its user to conduct various types or modes of microscopic examinations by a simplified examination mode changeover operation.

(b) Description of the Prior Art:

Recently, in such scientific technical fields as cell technology, there has been an increase in the number of instances wherein the same specimen is subjected to observations in various different types of microscopic examinations. For example, in case of an experiment of cell fusion which is conducted on two ova of a mouse, the nucleus of one of the ova is dyed with FITC (Fluorescein Isotyiocyanate), and the nucleus of the other ovum is dyed with TRITC (Tetramethl Rhodamine Isothiocynate), and thereafter these two ova are fused, and a Blue excitation beam is irradiated onto the resulting combined nucleic region. By observing the respective flurescent beams consisting of a yellowish green light caused by FITC and a yellow light of TRITC reflected therefrom, the presence of cell fusion is confirmed. However, in case it is intended to observe the configuration of the nucleic region, it is not possible to attain the intended purpose by merely relying on a reflecting fluorescence microscopy such as mentioned above. Thus, one will have to rely on phase contrast microscopy or differential interference microscopy to accomplish the intended purpose. As discussed above, it should be noted that, in case many-phase observations of a single specimen are to be conducted, various types of microscopic examinations will have to be relied upon, such as phase contrast microscopy, differential interference microscopy, reflecting fluorescence microscopy and bright field microscopy. In such a case, it is desired that the microscope per se be so constructed as will permit as easy and simple changeover between various different modes of microscopic examinations as possible.

As a conventional example of such a multiple-purpose microscope as outlined above, there is the one which is of the arrangement that an insertion region is formed at the revolver area and either a dichroic mirror unit for reflecting fluorescence microscopy or a differential interference unit is inserted into the insertion region to thereby perform a switching of the mode of microscopic examination from one type to another. It should be noted, however, that in case of this known changeover type microscope, the point of intersection of the optical axis of the light-projecting tube which is the source of the fluorescent light, with the optical axis of observation will move as the revolver moves vertically for focusing, making it impossible to hold an optimum condition of illumination. As a result, there arise the inconvenience that uneven illumination is developed.

SUMMARY OF THE INVENTION

It is, therefore, the main object of the present invention to provide a multiple-purpose microscope which avoids a move of the point of intersection of the optical axis of the fluorescent illuminating light with the optical axis of observation when the revolver moves vertically for focusing, thereby to develop even illumination in case a reflecting fluorescene microscopy.

According to the present invention, the above-mentioned object is attained by mounting, at a position adjacent to the revolver in the focusing means, a differential interference unit so as to be movable into and out of the path of a light beam, and also mounting, within the body of this microscope, a dichroic mirror unit for reflecting fluorescence microscopy in such a way as to be movable into and out of the path of the light beam.

According to a preferred formation of the present invention, the dichroic mirror unit for reflecting fluorescence contains a dichroic mirror, an exciting filter and a barrier filter. Accordingly, the microscope of the present invention can have a much more compact structure. In addition, at the same time that said unit is inserted in the path of the light beam, the exciting filter is inserted in the path of the light beam of the light projection tube serving as the fluorescent light source, while the barrier filter is inserted in the observation light path.

According to another preferred formation of the present invention, the dichroic mirror unit for reflecting fluorescence is mounted in a plural number. By selectively using them, it is possible to perform reflection fluorescence observations using different types of excited lights.

According to still another preferred formation of the present invention, the differential interference unit is constructed in the form of Nomarski slider. Whereby, a wide range observation of a specimen taken from a patient is feasible by a very simplified mode changeover operation.

These and other objects of the present invention will become more apparent during the course of the following detailed description and appended claims.

DETAILED DESCRIPTION OF THE PREFERRED EMBODIMENTS

Figure 1:
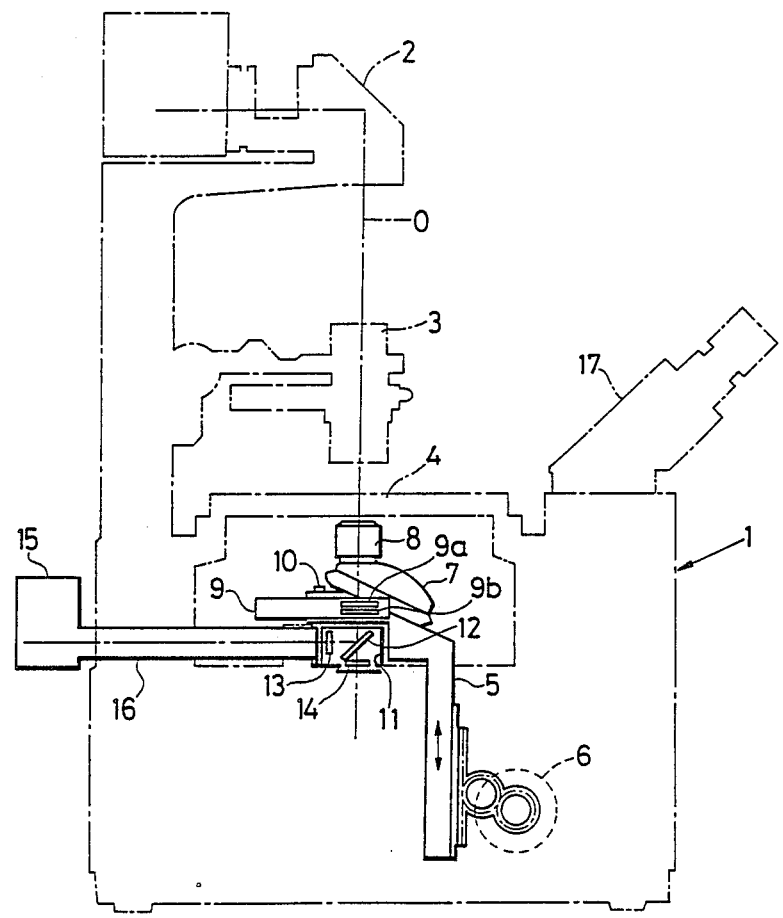
FIG. 1 is an explanatory illustration showing an embodiment of the multiple-purpose microscope according to the present invention.
Figure 2:
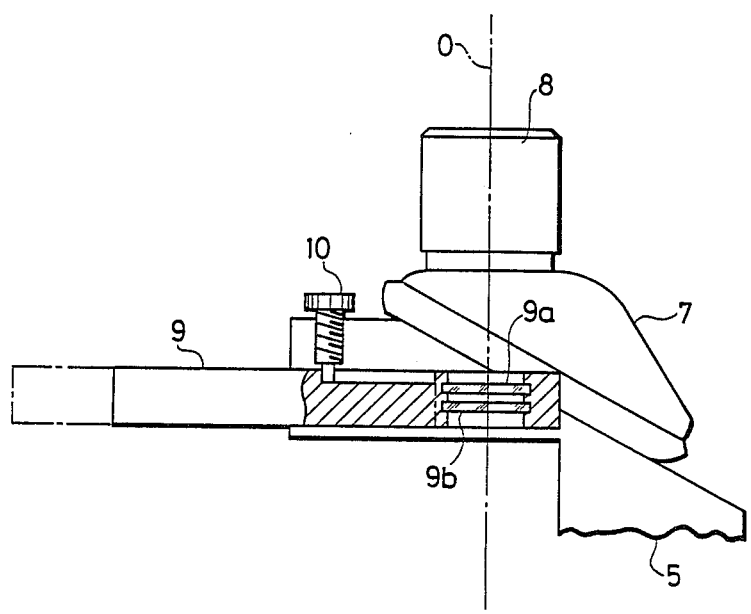
FIG. 2 is an enlarged illustration of a part of FIG. 1, showing a structure wherein a differential interference unit is attached.
Figure 3:
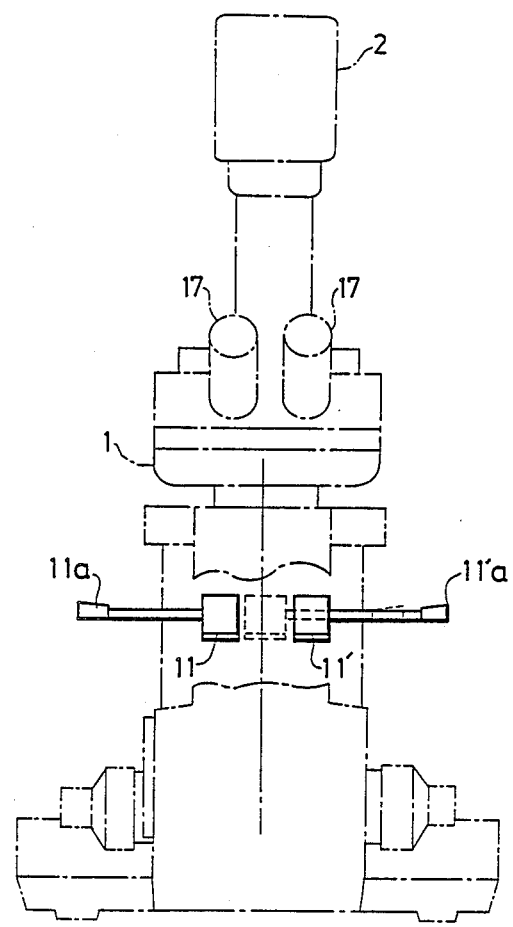
FIG. 3 is an explanatory illustration to show how a dichroic mirror unit for reflecting fluorescence is attached.

Referring to FIGS. 1 through 3, reference numeral 1 represents a microscope body, 2 an illuminating unit; 3 a condenser lens unit, 4 a stage fixedly mounted on the microscope body 1; and 5 a focusing means mounted, for vertical movement, within the microscope body 1.

Reference numeral 6 represents a focusing handle rotatably supported on a side wall of the microscope body 1 and capable of vertically moving the focusing means 5 through rack-pinion mechanism; 7 a revolver rotatably mounted on top of the focusing means 5; and 8 an objective lens supported on the revolver. Reference numeral 9 represents a Nomarski differential interference unit mounted, for horizontal slidable movement, on top of the focusing means 5 as clearly shown in FIG. 2 and arranged so as to be held, by a pin 10 screwed into said top, at a position at which a Nomarski prism 9a and an analyzer 9b both of the image side are inserted in a path of light beam, and also at a position at which the two members 9a and 9b are pulled out of the path of light beam. The Nomarski prism 9a and the analyzer 9b construct an analyzing-side unit. Reference numeral 11 represents a dichroic mirror unit for reflecting fluorescence mounted, for horizontal slidable movement, within the microscope body 1 by, for example, a dovetail-dovetail groove mechanism so as to be able to assume a position (indicated by dotted line in FIG. 3) at which it is inserted in the path of light and also a position (indicated by a solid line in FIG. 3) at which it is pulled out of the path of light, both by means of an externally operable handle 11a and 11' which is also a dichroic mirror unit for reflecting fluorescence, carrying therein an exciting unit, capable of easily corresponding with an exciting wavelength in the same operation as for the unit 11 and having an externally operable handle 11'a as shown in FIG. 3. Reference numeral 12 represents a dichroic mirror for reflecting fluorescence provided within the unit 11 and which is brought to a position at which it is aligned with the optical axis 0 when this unit 11 is inserted in the path of a light beam; 13 an exciting filter provided within the unit 11; 14 a barrier filter provided within the unit 11; and 15 a fluorescent light source means attached to the microscope body 1. Reference numeral 16 represents a light projecting tube provided within the microscope body 1 so as to be able to direct the beam of light coming from the fluorescent light source 15 to the dichroic mirror 12 via the exciting filter 13; and 17 represents an objective lens cylinder.

Figure 4:
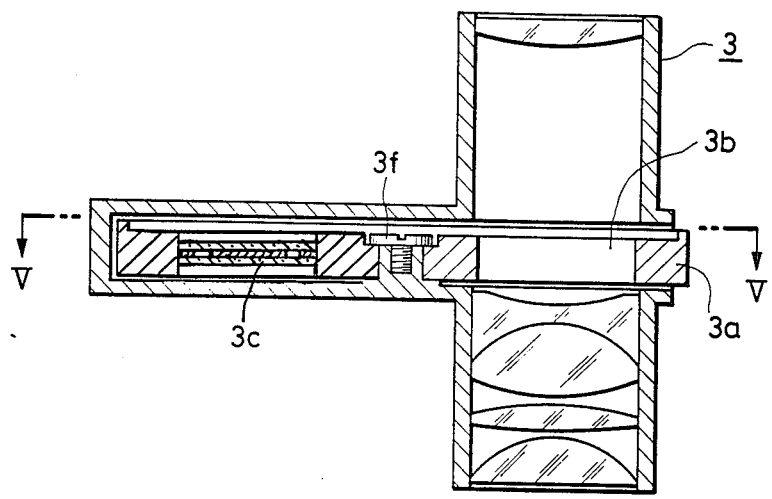
FIG. 4 is an enlarged sectional view showing the detailed structure of a condenser lens unit.
Figure 5:
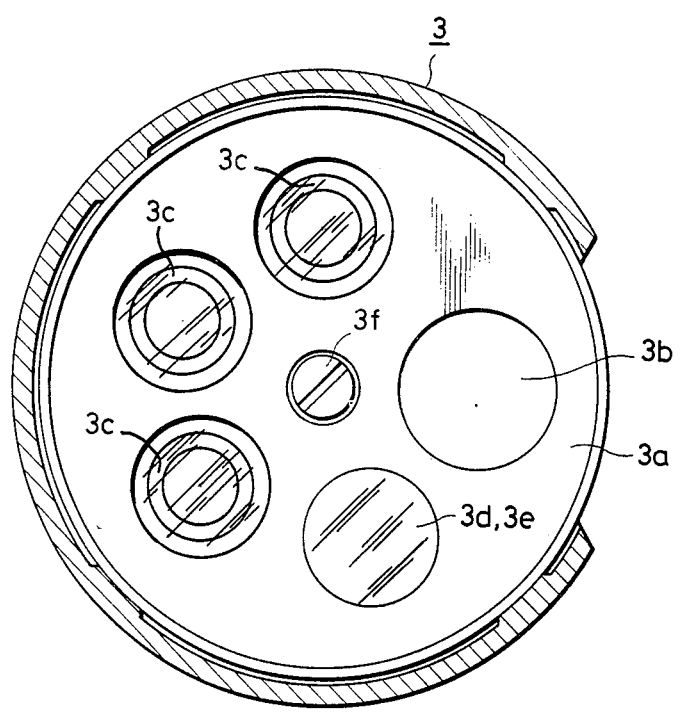
FIG. 5 is a sectional view along the line V—V of FIG. 4.

The condenser lens unit 3 includes, as shown in FIGS. 4 and 5, a turret 3a rotatably mounted around an axis 3f and having therein a cavity hole 3b, ring slits 3c and a polarizer 3d and illumination-side Nomarski prism 3e overlapped with each other, which are arranged so as to be able to be arbitrarily inserted into the path of the light beam. The polarizer 3d and the Nomarski prism 3e construct a polarizing-side unit.

Next, description will be made of respective types of microscopic examinations.

In case a differential interference microscopy is to be conducted, it is necessary to do the following simple steps which include, first of all, inserting, in the path of light beam of the condenser lens unit 3, the polarizer 3d and the illumination-side Nomarski prism 3e selected to correspond to the magnification power of the objective lens 8 which is to be used. In this state, the illumination-side Nomarski prism 3e locates before the front focus plane of the condenser lens. This is followed by causing the differential interference unit 9 to slide toward the right side to thereby insert both the image-side Nomarski prism 9a and the analyzer 9b into the path of the light beam, and finally moving the dichroic mirror unit 11 for reflecting fluorescence to the outside of the path of light beam. In this state, the image-side Nomarski prism 9a is attendant on the revolver 7 and locates behind the rear focus plane of the objective lens 9. In this case, since the prism 9a has been designed, when manufactured, so as to enter into a position having above relationship with the focal position behind the objective lens 8, it is possible to readily make the observation of a clear image even after the reflecting fluorescence microscopy mode without requiring a readjustment of the position of the objective lens 8.

In case phase contrast microscopy is to be performed, it is necessary to insert, in the path of light beam of the condenser lens unit 3, a ring slit 3c which has been selected to correspond to the magnification of the objective lens which is to be used (along with a phase plate) instead of the polarizer 3d, and to move both the differential interference unit 9 and the dichroic mirror unit 11 for reflecting fluorescence to the outside of the path of light beam.

In case a reflecting fluorescence microscopy is to be performed, it is necessary to insert the cavity hole 3b in the path of the light beam of the condenser lens unit 3, to move the differential interference unit 9 to the outside of the path of light beam and to insert the dichroic mirror unit 11 for reflecting fluorescence into the path of light beam, and to turn on the fluorescence light source means 15. In this case, the dichroic mirror 14 and the optical axis of the projection tube 16 are accurately brought into agreement relative to each other on the optical axis 0 when the unit 11 is inserted in the path of light beam, and this relationship is always held constant regardless of the vertical movement of the revolver 7 caused by the focusing means 5. In such a case, it is possible to provide, within the microscopy body in the same manner as for the unit 11, a dichroic mirror unit 11', for reflecting fluorescence carrying therein an exciting unit of a type which is different from the unit 11, as shown in FIG. 3. This arrangement makes it possible, by a simplified changeover operation, to select any two of the exciting units U, V, B and G and to perform a reflecting fluorescence observation using mutually different excited light beams. Thus, it is possible to further enhance the convenience of the multiple-purpose microscope of this kind.

In case of an ordinary bright field microscopy, it is necessary to insert the cavity hole 3b in the path of the light beam of the condenser lens unit 3, to bring both the differential interference unit 9 and the dichroic mirror units 11 and 11' for reflecting fluorescence to the outside of the path of light.

As will be apparent from the foregoing description, in the state of arrangement that those units necessary for performing various kinds of microscopic examination are incorporated within one microscope body, the user is required only to selectively operate these units, whereby any desired microscopy is realized. Thus, there will arise no fear that the units inadvertently come off and be damaged. Moreover, it becomes possible to display, to the maximum extent, the optical functions of the microscope in such a manner as are suited for any one of these respective types of microscopic examinations.

Description has been made above with respect to the embodiments in which the present invention is applied to an upside-down type microscope. Needless to say, the present invention can be applied, without modification, directly to the normal type microscope.

Figure 6:
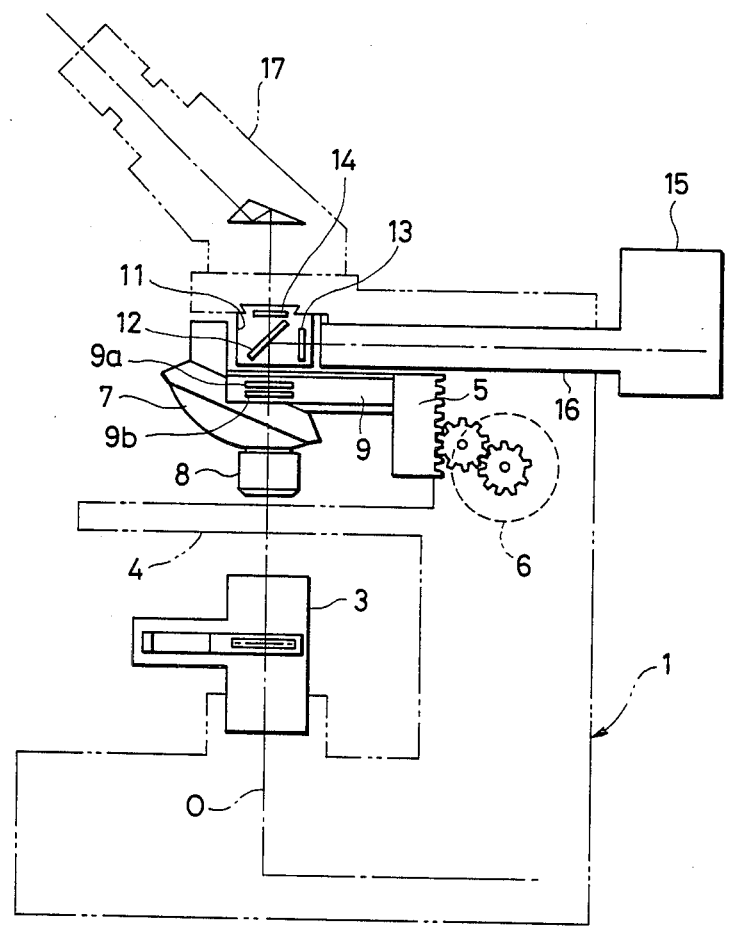
FIG. 6 is an explanatory illustration showing another embodiment of the multiple-purpose microscope according to the present invention.

FIG. 6 shows an embodiment in which the present invention is applied to the normal type microscope. In this embodiment, like reference numerals are assigned to those parts and members which are substantially the same as those in FIG. 1, and their detailed description is omitted. It should be noted here that, in these embodiments, the differential interference unit is shown to be constructed in the form of a Normarski slider, but that any other type of unit may be used.

What is claimed:

1. A multi-purpose microscope, comprising:
   a microscope body;
   an illuminating unit mounted to said microscope body for emitting an illuminating light beam;
   a condensor lens unit mounted to said microscope body and including a selectable positioning unit for selectively positioning one of a cavity hole, a ring slit and a polarizing-side unit for a differential interference microscopy into a path of the light beam from said illuminating unit;
   a stage fixedly mounted to said microscope body;
   a revolver mounted to said microscope body for holding a plurality of objectives and including an analyzing-side unit for differential interference microscopy mounted for movement through a guide into and out of an optical path of said microscope body;
   focusing means mounted to said microscope body and coupled to said revolver for moving said revolver along said optical path of said microscope body;
   a fluorescent light source mounted to said microscope body at a point spaced from said optical path of said microscope body for emitting a fluorescent light beam; and
   a dichroic mirror unit mounted to said microscope body and being selectively insertable into said optical path of said microscope body at a point spaced from said revolver for bringing a reflecting illumination light beam from said fluorescent light source into said optical path.

2. A multiple-purpose microscope according to claim 1, in which:
   said analyzing side unit is constructed in the form of a Nomarski slider.

3. A multiple-purpose microscope according to claim 1, in which:
   said dichroic mirror unit for reflecting fluorescence comprises: a dichroic mirror, an exciting filter and a barrier filter.

* * * * *